(12) United States Patent
Xie et al.

(10) Patent No.: US 7,161,682 B2
(45) Date of Patent: *Jan. 9, 2007

(54) METHOD AND DEVICE FOR OPTICAL NAVIGATION

(75) Inventors: Tong Xie, San Jose, CA (US); Marshall T. DePue, San Mateo, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 5 days.

This patent is subject to a terminal disclaimer.

(21) Appl. No.: 10/680,525

(22) Filed: Oct. 6, 2003

(65) Prior Publication Data

US 2005/0024336 A1 Feb. 3, 2005

Related U.S. Application Data

(63) Continuation-in-part of application No. 10/630,169, filed on Jul. 30, 2003.

(51) Int. Cl.
- *G01B 9/02* (2006.01)
- *G01B 11/02* (2006.01)

(52) U.S. Cl. ..................... 356/520; 356/498
(58) Field of Classification Search .............. 356/520, 356/450, 497, 498, 521, 28, 28.5, 496, 499; 250/208.1, 221
See application file for complete search history.

(56) References Cited

U.S. PATENT DOCUMENTS

| | | | |
|---|---|---|---|
| 3,881,879 A * | 5/1975 | Hirabayashi et al. .......... 355/2 |
| 4,794,384 A | 12/1988 | Jackson | |
| 4,857,903 A * | 8/1989 | Zalenski .................... 345/166 |
| 5,578,813 A | 11/1996 | Allen et al. | |
| 5,644,139 A | 7/1997 | Allen et al. | |
| 5,786,804 A | 7/1998 | Gordon | |
| 6,220,686 B1 * | 4/2001 | Ludi et al. ..................... 347/4 |
| 6,222,174 B1 * | 4/2001 | Tullis et al. ............. 250/208.1 |
| 6,246,482 B1 * | 6/2001 | Kinrot et al. ............... 356/499 |
| 6,256,016 B1 * | 7/2001 | Piot et al. .................... 345/166 |
| 6,281,882 B1 | 8/2001 | Gordon et al. | |
| 6,373,047 B1 * | 4/2002 | Adan et al. ................. 250/221 |
| 6,424,407 B1 * | 7/2002 | Kinrot et al. ................. 356/28 |
| 6,433,780 B1 | 8/2002 | Gordon et al. | |
| 6,442,725 B1 | 8/2002 | Schipke et al. | |
| 6,525,306 B1 * | 2/2003 | Bohn ........................ 250/221 |
| 6,642,506 B1 * | 11/2003 | Nahum et al. ......... 250/231.13 |
| 6,707,027 B1 * | 3/2004 | Liess et al. ................. 250/221 |
| 2002/0080117 A1 | 6/2002 | Son et al. | |
| 2002/0175274 A1* | 11/2002 | Black ........................ 250/216 |
| 2005/0024623 A1* | 2/2005 | Xie et al. .................. 356/3.01 |

OTHER PUBLICATIONS

Search Report from corresponding application number EP 04 00 9854 (3 pages).

* cited by examiner

*Primary Examiner*—Gregory J. Toatley, Jr.
*Assistant Examiner*—Michael A. Lyons

(57) ABSTRACT

An method and device suitable for navigation on a wide variety of surfaces is introduced. Specular reflection is used to determine relative motion over typical surfaces. A specific application is a computer mouse.

20 Claims, 13 Drawing Sheets

METHOD AND DEVICE FOR OPTICAL NAVIGATION

Related Applications

This application is a continuation-in-part of U.S. patent application Ser. No. 10/630,169 filed on Jul. 30, 2003.

TECHNICAL FIELD

This application relates to motion sensing devices and more particularly to devices, systems and methods for using specular reflection images to determine relative motion.

BACKGROUND OF THE INVENTION

Optical relative motion detection devices typically utilize image correlation techniques to determine relative motion between the navigation device and a surface by capturing images of the surface as the navigation device passes over the surface or as the surface moves past the navigation device. Both the displacement and the direction of the relative motion of the navigation device with respect to the surface are determined by comparing one image with the following image. Typically, intensity variations due to shadows cast on the surface are detected and the sensitivity and applicability of this technique depend on the intensity contrast in the captured images. Relative motion navigation devices are used, for example, for computer screen pointer (e.g. mouse) control.

U.S. Pat. No. 5,786,804, 5,578,813, 5,644,139, 6,442,725, 6,281,882 and 6,433,780 disclose examples of optical mice, other hand-held navigation devices and hand-held scanners. These patents are incorporated herein by reference.

Typical existing optical navigation devices use light emitting diodes (LEDs) to obliquely illuminate the surface to be navigated. Height variations on the surface, on the order of 5 to 500 μm, cast shadows described by geometrical ray optics. The size and contrast of the shadow pattern images depends in part on the type of surface through the size of the height variation. Typically, the detector is positioned to receive the reflection in the surface normal direction and the angle between the surface and the incident light is typically selected to optimize the contrast of the shadow pattern images as is familiar from dark field imaging. Typical values for the angle of incidence are in the range from about 5 degrees to about 20 degrees.

Smooth surfaces such as whiteboard, high gloss paper, plastic or painted metal present functional challenges to typical current optical navigation devices. In general, smooth surfaces are those containing less mid spatial frequency and more high spatial frequency structures. To increase the signal level, high optical power is required for LED illumination resulting in typical current draws in excess of 30 mA.

SUMMARY OF THE INVENTION

In accordance with the invention, a preselected angular distribution of reflected light is captured by the detector of an optical navigation device. Typically, the detector of the optical navigation device is positioned to capture the specular reflection from the surface. The specular reflection creates an image that differs from both shadow pattern images and speckle patterns. Specular reflection typically provides a better signal compared to the shadow pattern image approach. This allows high contrast images to be obtained even on extremely smooth surfaces. Additionally, image quality is preserved with respect to Lambertian surfaces because light is still scattered into the specular direction. The specular reflection images depend on the wavelength of the illumination source; typically the contrast of the specular reflection images increases as the bandwidth of the illumination source decreases, therefore laser based illumination affords the highest contrast.

In accordance with the invention, use of a defocused optical configuration is disclosed where the detector is imaging a plane in space that may lie above or below the surface to be navigated on. Coherent illumination such as that obtained from a vertical cavity surface emitting laser (VCSEL) is used to produce high contrast specular reflection images for surface navigation.

DETAILED DESCRIPTION OF THE INVENTION

If a light beam is incident on a smooth surface, the light rays of the incident beam reflect and remain concentrated in a bundle upon leaving the smooth surface. However, if a surface is microscopically rough, then the light rays reflect and scatter in many different directions. The spatial frequency corresponding to the surface roughness may be on the scale of the illumination wavelength. Each individual ray follows the law of reflection. However, in the case of a rough surface each individual ray meets a portion of the surface that has a different orientation. Therefore, the surface normal is different for different incident light rays. Hence, when the individual rays reflect according to the law of reflection, the individual rays scatter in different directions. Furthermore, when either a coherent or a quasi-coherent illumination is applied, high contrast intensity patterns produced by interference among the reflected and the scatter light may be observed in the specular reflected images. The interference effects provide enhanced contrast to the image for navigation.

Figure 1A:
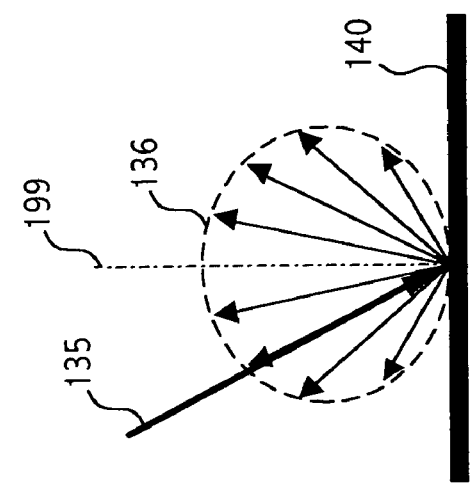
FIGS. 1a–1c illustrate light reflection from different types of surfaces.
Figure 1B:
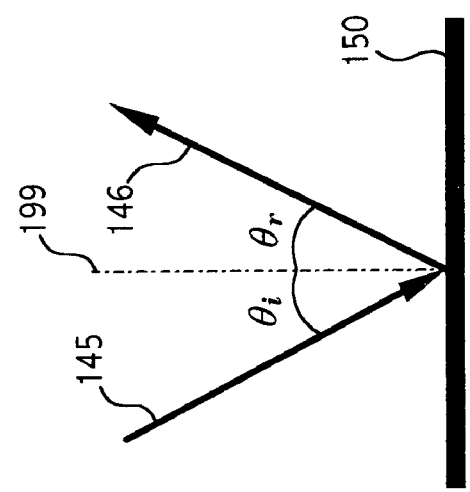
Figure 1C:
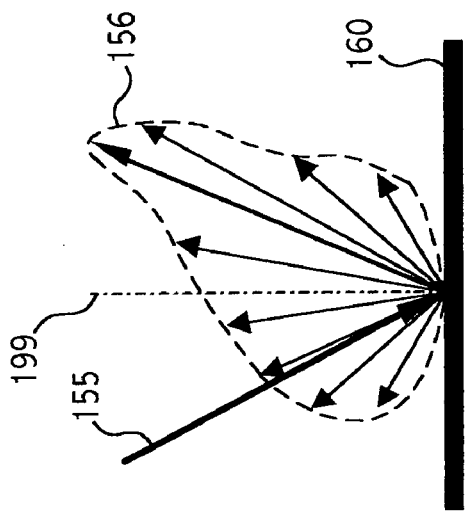

FIGS. 1a–1c illustrate light reflection from different types of surfaces. FIG. 1a shows reflection of light beam 135 from Lambertian surface 140 into beam pattern 136. A Lambertian surface is a perfectly diffusing surface and the intensity of the light emanating in a given direction from any small surface component is proportional to the cosine of the angle of normal 199 to surface 140. FIG. 1b shows reflection of light beam 145 from specular reflector surface 150 into beam 146 which is at an angle $\theta_r=\theta_i$, where the angles are defined with respect to surface normal 199. FIG. 1c shows light beam 155 reflecting from surface 160 into beams 156. Surface 160 is intermediate in surface characteristics between surface 140 and surface 150 and there is a specular component as well as a Lambertian component to beam pattern 156.

It is important to note that specular reflection is not related to optical speckle. Intensity patterns from specular reflection off the surface to be navigated over result from either coherent or quasi-coherent light. The feature rich intensity patterns obtained in accordance with the invention vary markedly across different types of surfaces and typically have a one to one correlation with the underlying surface. In contrast, speckle images are highly statistical in nature and to a first approximation are not variable across different types of surfaces. Speckle images exhibit image patterns where the one-to-one correspondence to visible underlying surface features is limited. Although speckle is present anytime objects are illuminated by coherent light, the average size of optical speckle is typically smaller than the pixel size of the imaging array for typical optical navigation applications. When pixel size is appreciably larger than the mean speckle size, speckle is no longer a reliable pattern for optical navigation because the multiple bright and dark speckle features incident on a pixel of the detector array are averaged out over the pixel area. For example, taking an imaging system with an f number of 10 and a laser source operating at 850 nm results in an average speckle size=8.5 µm using the formula:

average speckle size=f×λ where f is the f number and λ is the wavelength. Here, taking a typical detector array with a pixel size of 60 µm results in more than 49 speckles imaged by each pixel of the detector array. The resulting averaging removes potentially navigable features from the speckle distribution.

Figure 1D:
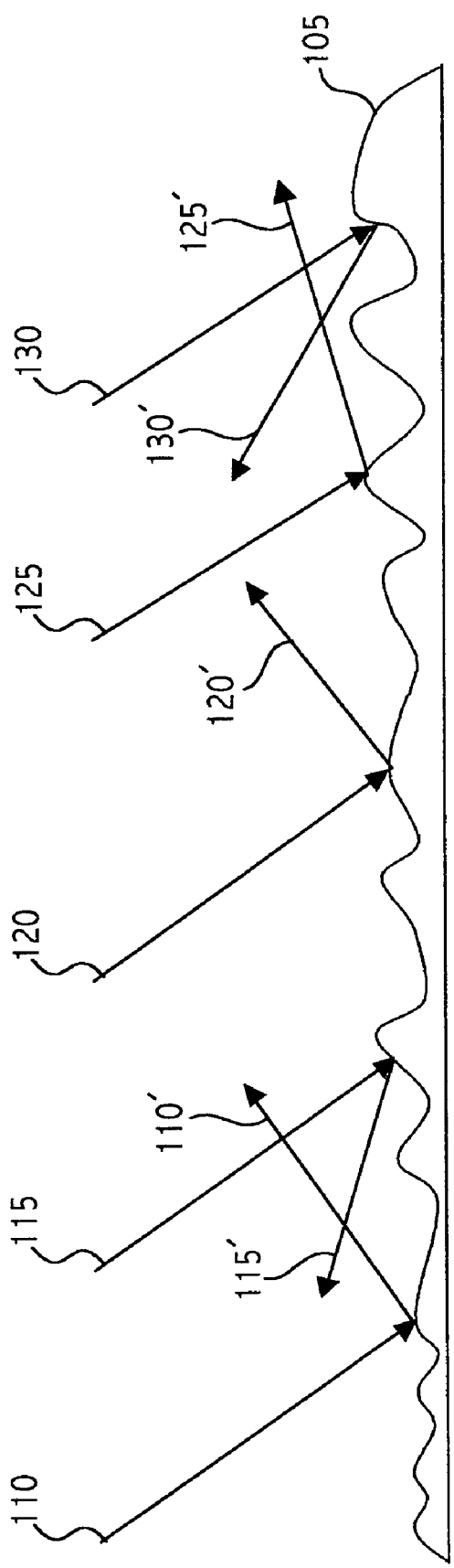
FIG. 1d illustrates the concept of scattering from a surface in accordance with the invention.

FIG. 1d is a simplified illustration of scattering from rough surface 105 in accordance with the invention. Incident light rays 110, 115, 120, 125, 130 of an incident light beam each follow the law of reflection resulting in reflected light rays 110', 115', 120', 125', 130' from rough surface 105 and are scattered upon reflection. Light as referred to herein is intended to include electromagnetic radiation over a wavelength range extending from about 1 nanometer (nm) to about 1 millimeter (mm).

Figure 2:
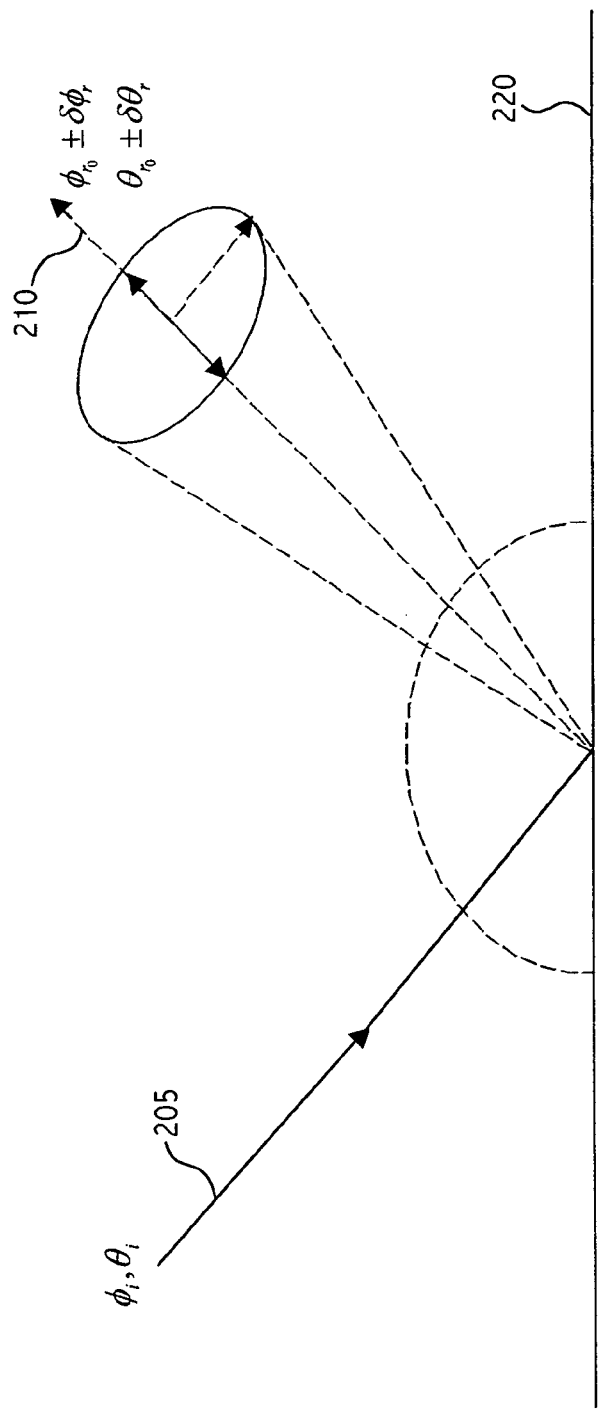
FIG. 2 illustrates specular reflection in accordance with the invention.

FIG. 2 shows a more detailed view of specular reflection from a surface in accordance with the invention. Incident light ray 205 has angular coordinates $\phi_i, \theta_i$ before reflection by surface 220. Typically, surface 220 will have a microscopic roughness or optical irregularity that effects the reflection angle of the reflected light. If reflected light ray 210 lies in the angular cone defined by $\phi_{r0} \pm \delta\phi_{r0}, \theta_{r0} \pm \delta\theta_r$, the surface element corresponding to light ray 205 will be captured by the detector.

Figure 3A:
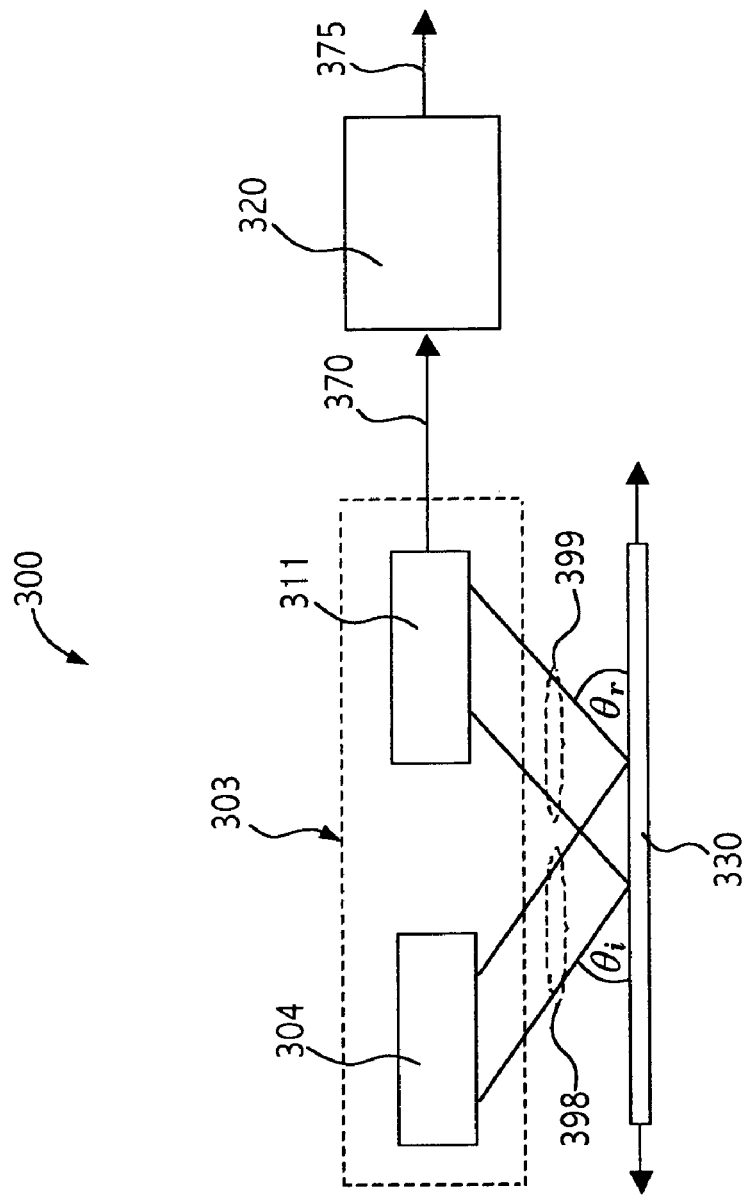
FIG. 3a shows a high level block diagram in accordance with the invention.

FIG. 3a is a high level block diagram in accordance with the invention for optical navigation system 300 based on using specular reflection for navigation. Surface 330 is illuminated by light beam 398 from light source unit 304. Specular reflected light beam 399 is reflected from surface 330 to be detected by detector array unit 311 which generates signal 370 that goes to processor 320. Processor 320 provides output signal 375 in response to signal 370. Output signal 375 may be used, for example, to drive the position of a pointer on a computer screen. Processor 320 may be part of optical navigation device 303 or be located elsewhere in optical navigation system 300. In accordance with the invention, some embodiments of optical navigation device 303 may be an optical mouse for a computer system that is hand moveable.

Figure 3B:
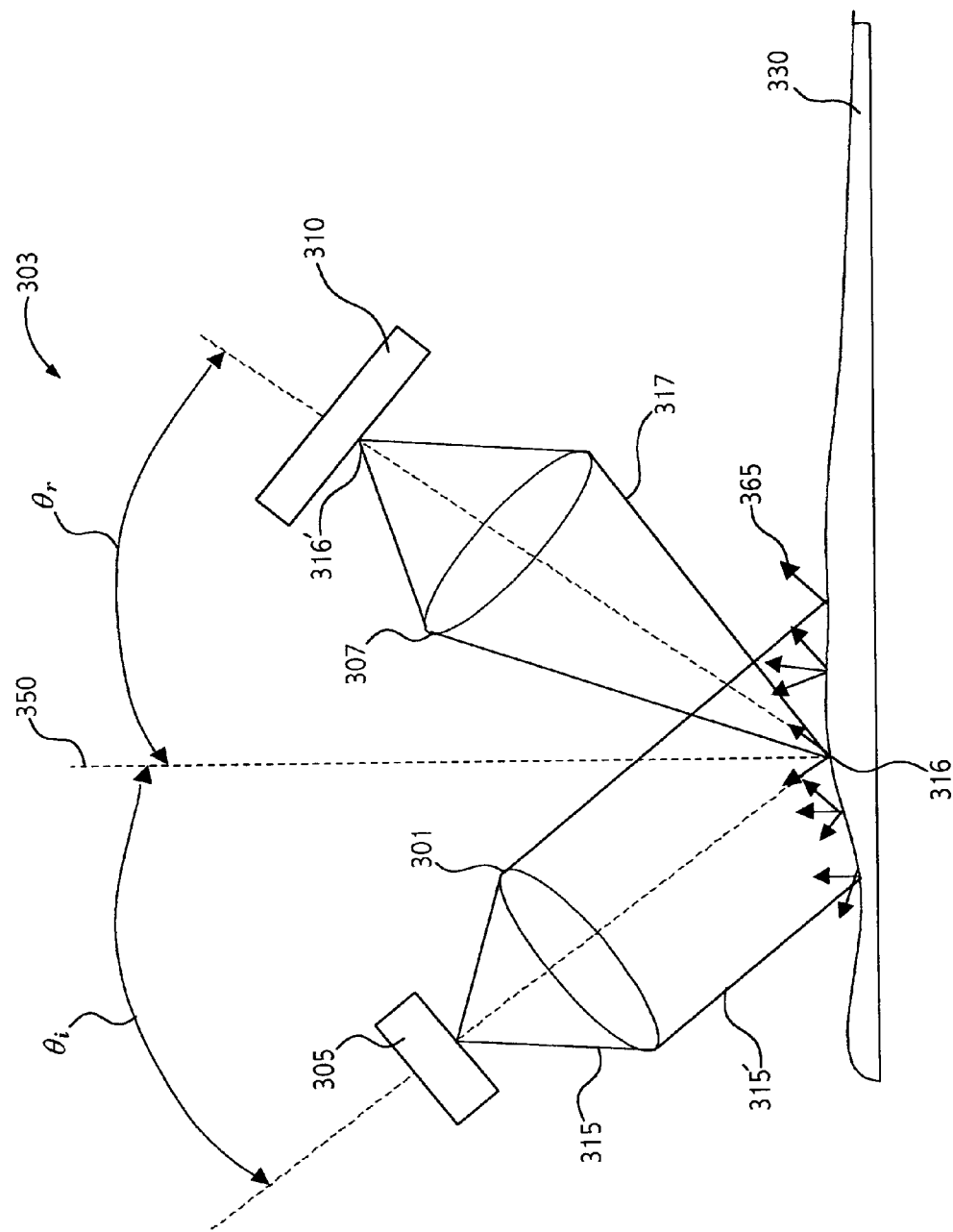
FIG. 3b shows a simplified illustration of optical components of an embodiment in accordance with the invention.

FIG. 3b shows a simplified illustration of components for optical navigation device 303 in accordance with an embodiment of the invention. Light source 305, part of light source unit 304 (see FIG. 3a), is positioned at incident angle $\theta_i$ with respect to surface normal 350 and provides light beam 315 incident on lens 301 to produce beam 315'. Lens 301 primarily functions to improve the collection efficiency for beam 315 and lens 301 is optional. Lens 301 may, for example, be a collimating lens. However, beam 315 need not be collimated if, for example, light source 305 is a coherent source such as a VCSEL or edge emitting laser. The use of a coherent source allows improved image contrast because of the coherent interference between reflected rays 365.

If light source 305 is quasi coherent source such as a narrow band LED (light emitting diode) or LED with a narrow bandwidth filter then lens 301 or a limiting aperture may be needed for navigation on smooth surfaces. Use of a limiting aperture reduces the power incident on surface 330 but improves spatial coherence. If lens 301 is used, lens 301 may be a diffractive or a refractive lens or other suitable optical element and may be optically coated to improve performance. Instead of using a narrowing aperture together with a conventional narrowband LED, a narrowband edge emitting LED may be used as the light source.

In the context of this patent, a detector is defined to be a device that converts photons to electrical signals. Detector array 310, part of detector array unit 311 (see FIG. 3a) is positioned at reflection angle $\theta_r$ selected such that $\theta_r \approx \theta_i$. Only reflected rays 365 from surface 330 having $\theta_r \approx \theta_i$ make up beam 317 and will be received by detector array 310. In accordance with an embodiment of the invention, the illuminated portion of surface 330 is imaged by lens 307. Point 316 on surface 330 is imaged by lens 307 into point 316' on detector array 310. Hence, the imaging optics allow capture of an image by 310. The image produced by a coherent light source typically includes surface features and interference features. The presence of speckle in the image is not used for navigation in accordance with the invention. The interference features arise from coherent addition of individual rays in the specular reflection field. Imaging lens 307 may be a diffractive or refractive lens or other suitable optical element to image portions of surface 330 and may be optically coated with a dielectric thin film to improve performance. Light source 305 typically is a narrow band laser source such as a VCSEL (vertical cavity surface emitting laser) or an edge emitting laser but may be a narrow band LED while detector array 310 is typically a CCD, CMOS, GaAs, amorphous silicon or other suitable detector array. Performance of detector array 310 may be improved by application of anti-reflection dielectric coatings to detector array 310.

Having a higher surface contrast and resolution allows optical navigation device 303 to navigate on smoother surfaces. The effective resolution is defined as the smallest resolvable feature on the navigation surface, such as surface 330. The effective resolution depends on the optical transfer function, the magnification of the optics and the effective pixel size of the detector array, such as detector array 310.

If magnification is fixed, higher surface resolution requires that, for example, detector array 310 have smaller pixels. The maximum navigation speed over surface 330 for optical navigation device 303 is limited by the maximum frame rate of detector array 310 as well as the processing time for the cross-correlation calculation. The physical displacement of optical navigation device 303 with respect to surface 330 is measured in units of effective pixel size. This means that if the pixel size of detector array 310 of optical navigation device 303 is reduced, the responsivity or maximum navigation speed of optical navigation device 303 will be reduced. Typically, tradeoffs between the cost of detector array 310, processor 320, total power consumption and desired responsivity are considered and balanced to arrive at the surface resolution and optical magnification for embodiments in accordance with the invention.

In accordance with an embodiment of the invention, as optical navigation device 303 moves relative to surface 330, scatter patterns are created at different relative positions between optical navigation device 303 and surface 330. Each scatter pattern is created by the specular reflection from surface 330 that is in the field of view of detector array 310. The scatter pattern images depend strongly on the wavelength of light source 305. Typically, the wavelength of light source 305 is selected to be at the peak of detector array 310. Because image contrast and signal are typically improved over the prior art shadow pattern optical navigation systems, shorter image integration times are required which allows higher frame rate acquisition to allow navigation at higher velocities.

By comparing successive stored specular reflection images in processor 320, the relative motion of optical navigation device 300 with respect to surface 330 can be determined. Correlation of successive scatter pattern images is typically used to determine the displacement of the relative movement. Successive captured scatter pattern images partially overlap with one another. Hence, processor 320 identifies features in each scatter pattern image and calculates the displacement and direction of the relative motion. Storing successive scatter pattern images, overlapping features can be identified by processor 320 using standard image correlation algorithms to provide direction and displacement. Further details may be found, for example, in U.S. Pat. No. 5,786,804 incorporated herein by reference. In accordance with the invention, relative motion even over very smooth but not optically polished surfaces, such as, for example, glass can be determined.

Figure 3C:
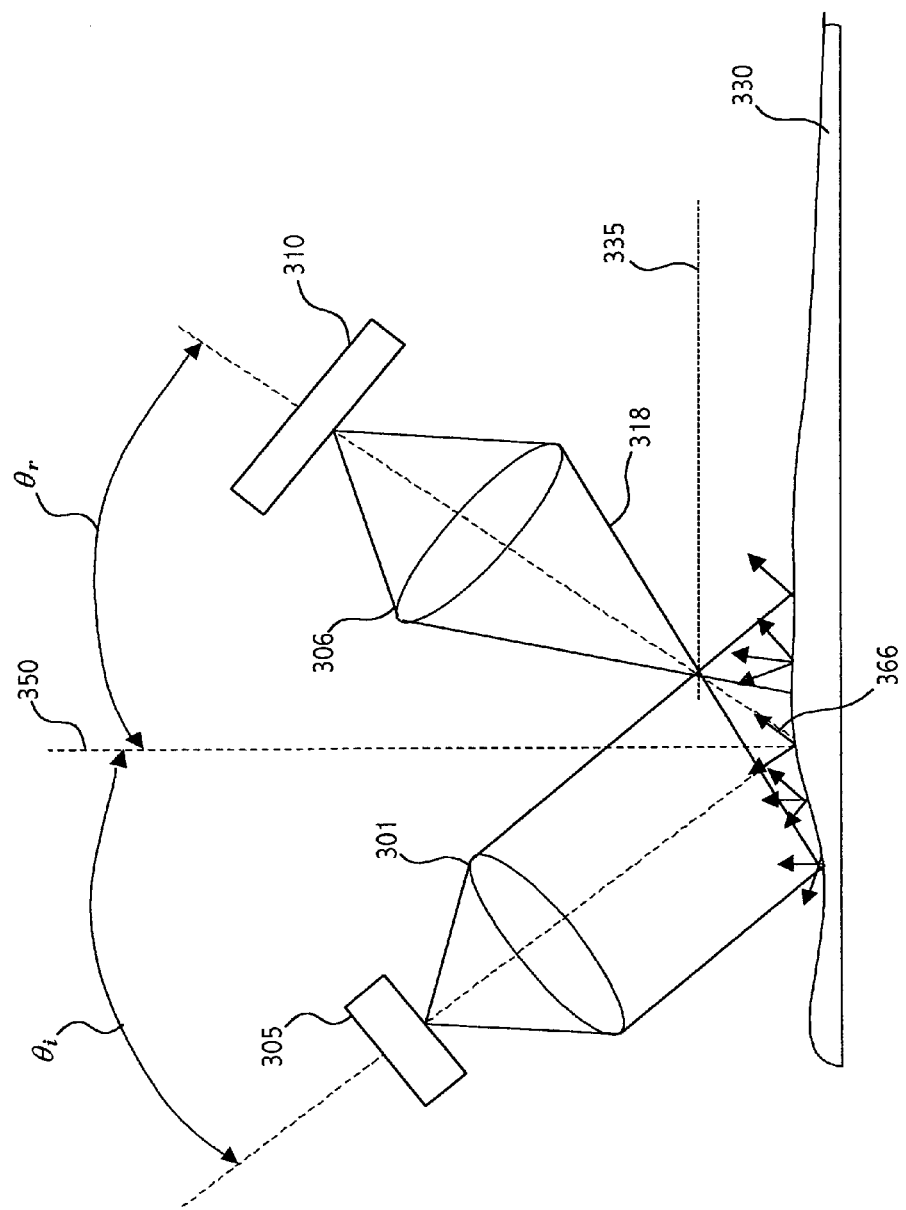
FIG. 3c shows a simplified view of embodiment in accordance with the invention where the nominal image plane does not coincide with the surface to be navigated.
Figure 3D:
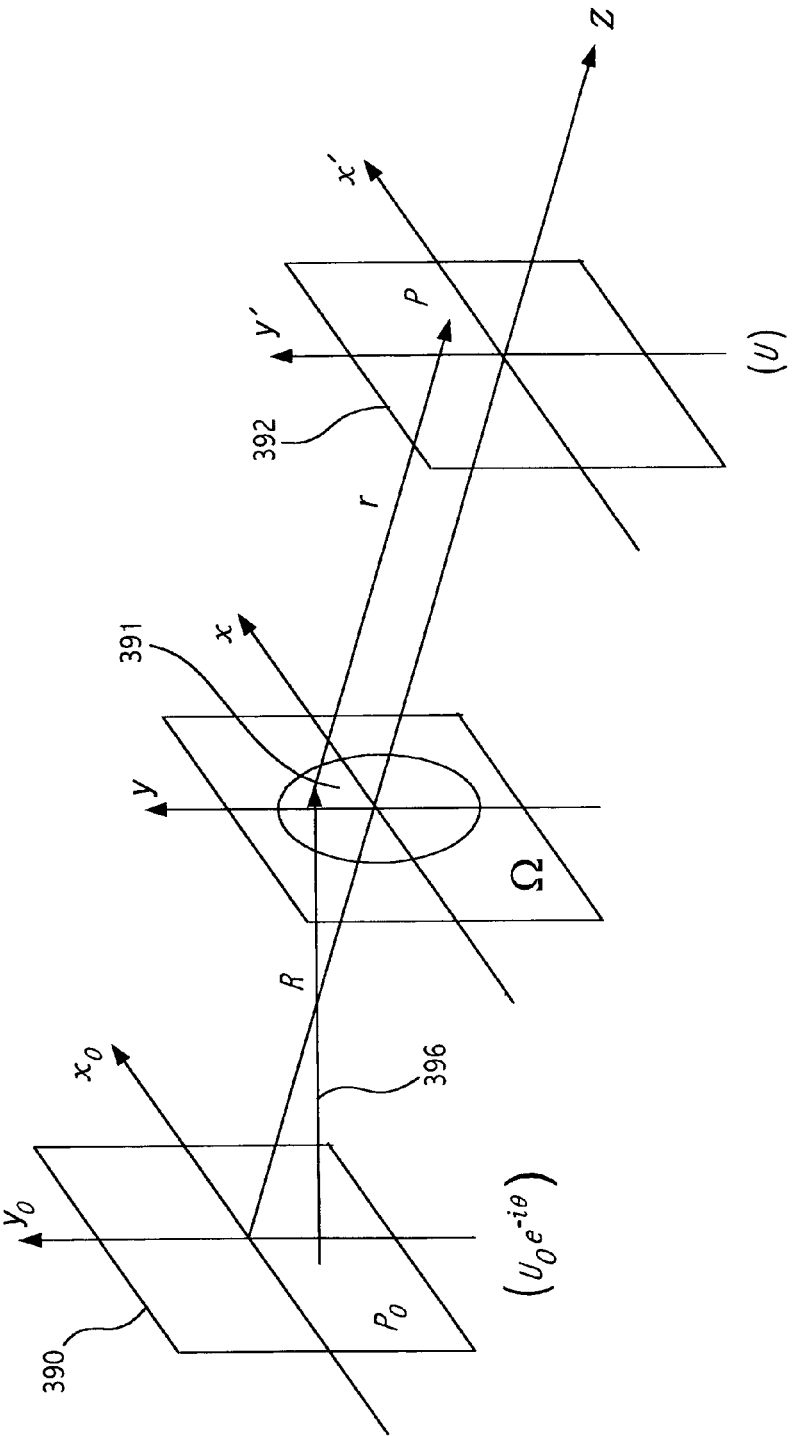
FIG. 3d illustrates the concept of scalar diffraction theory.

When using a coherent source, the coherent interference nature of the specular reflection image provides high contrast intensity patterns for navigation so that imaging of the surface to the detector is not required. FIG. 3c shows a simplified view of embodiment in accordance with the invention where nominal image plane 335 does not coincide with surface 330. As well as nominal image plane 335 being above surface 330, lens 306 may also be selected such that nominal image plane 335 lies below surface 330. Surface intensity and height variations on surface 330 result in amplitude and phase modulation of beam 317. Coherent interference among reflected rays 366 results in intensity patterns that may be described by scalar diffraction theory. Under the defocused condition shown in FIG. 3c where nominal image plane 335 does not coincide with surface 330, the intensity pattern detected by imager 310 is the diffraction pattern of the specularly reflected coherent light field and is given by the well-known Fresnel-Kirchhoff integral in Eq. (1):

$$U(x', y', z_1) \approx \frac{-iU_0 k}{4\pi} \int\int_\Omega \frac{e^{ik(r+R)}(\hat{r} - \hat{R}) dx dy}{rR} \quad (1)$$

with reference to FIG. 3d, $U(x',y',z_1)$ is the scalar field in observation plane 392, $U_0$ is the field amplitude in source plane 390 and $\Omega$ represents area of integration, aperture 391. The intensity I is given by $I=|U|^2$ and is determined by the coherent addition of all rays 396 passing through aperture 391. With respect to FIG. 3c, for example, aperture 391 corresponds to the illuminated portion of surface 330. The diffraction images of the illuminated portion of surface 330 are described by Eq. (1) and are used for navigation on surface 330 in an embodiment in accordance with the invention.

Figure 4A:
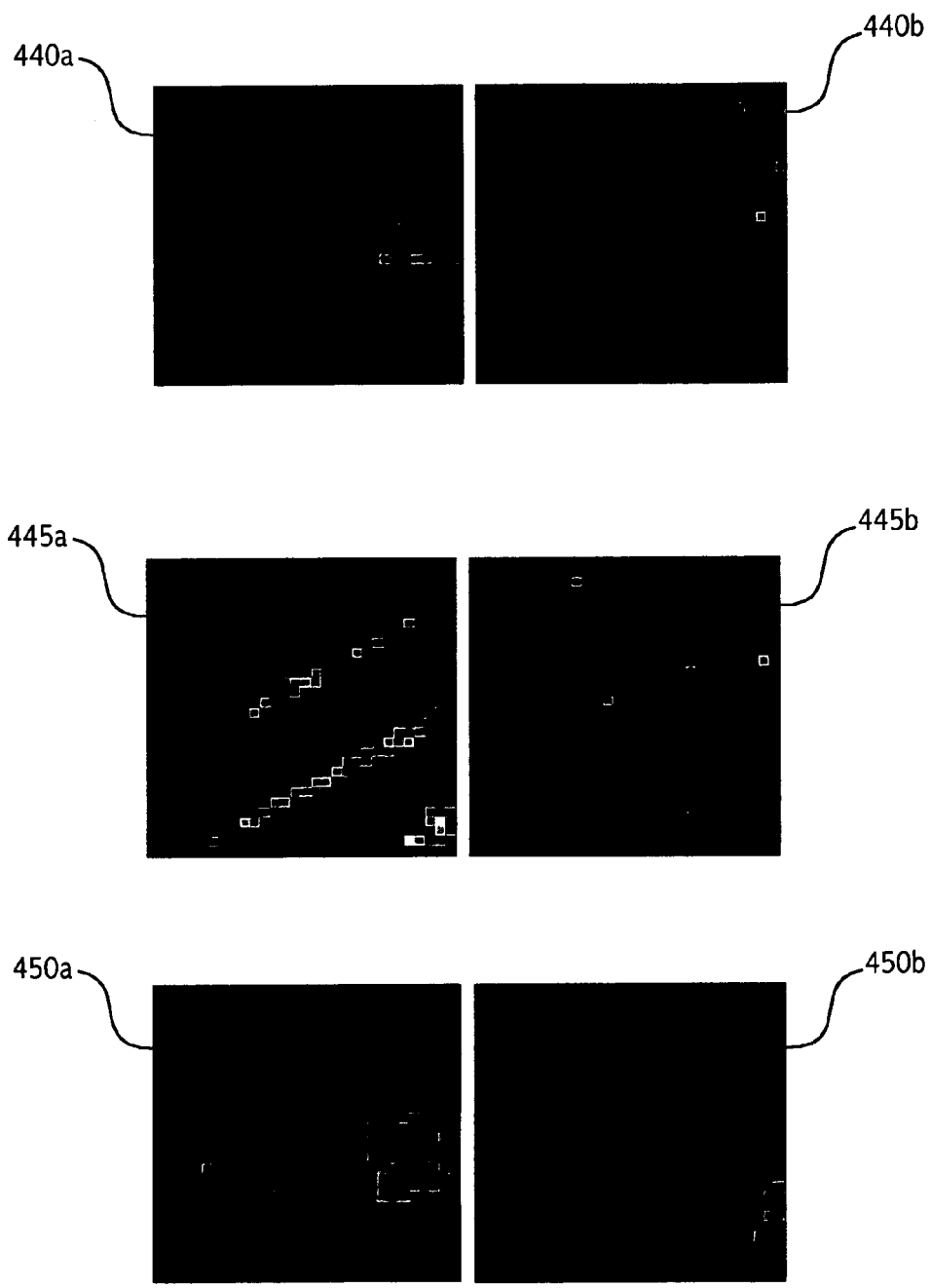
FIG. 4a shows images of various navigation surfaces in focused and defocused states.

Use of the diffraction images for navigation on surface 330 typically eliminates problems that may be caused by quasi-periodic surface features. FIG. 4a shows images of exemplary wood grain containing surfaces 440a, 440b, text containing surfaces 445a, 445b and holographic pattern containing surfaces 450a, 450b, Images of surfaces 440a, 445a and 450a in FIG. 4a are focused whereas images of surfaces 440b, 445b and 450b are defocused. Relative motion between navigation device 303 and surface 330 are determined from the cross-correlation between consecutively captured images. Periodic or unidirectional patterns such as those shown in FIG. 4a typically produce problems for motion detection algorithms because of the presence of multiple peaks in the cross-correlation calculation. Reduction of such problems typically requires specialized image processing algorithms and filters to be applied to the captured images prior to application of the cross-correlation. By defocusing optical navigation system 300, the intensity patterns are blurred out or low pass filtered as seen in pictures of surfaces 440b, 445b and 450b in FIG. 4b. However, the contrast of the images remains high due to the coherent interference property of the diffraction image. Hence, defocusing optical navigation system 300 allows navigation device 303 to function well over a large variety of surfaces without the need for the introduction of extensive image processing.

Figure 4B:
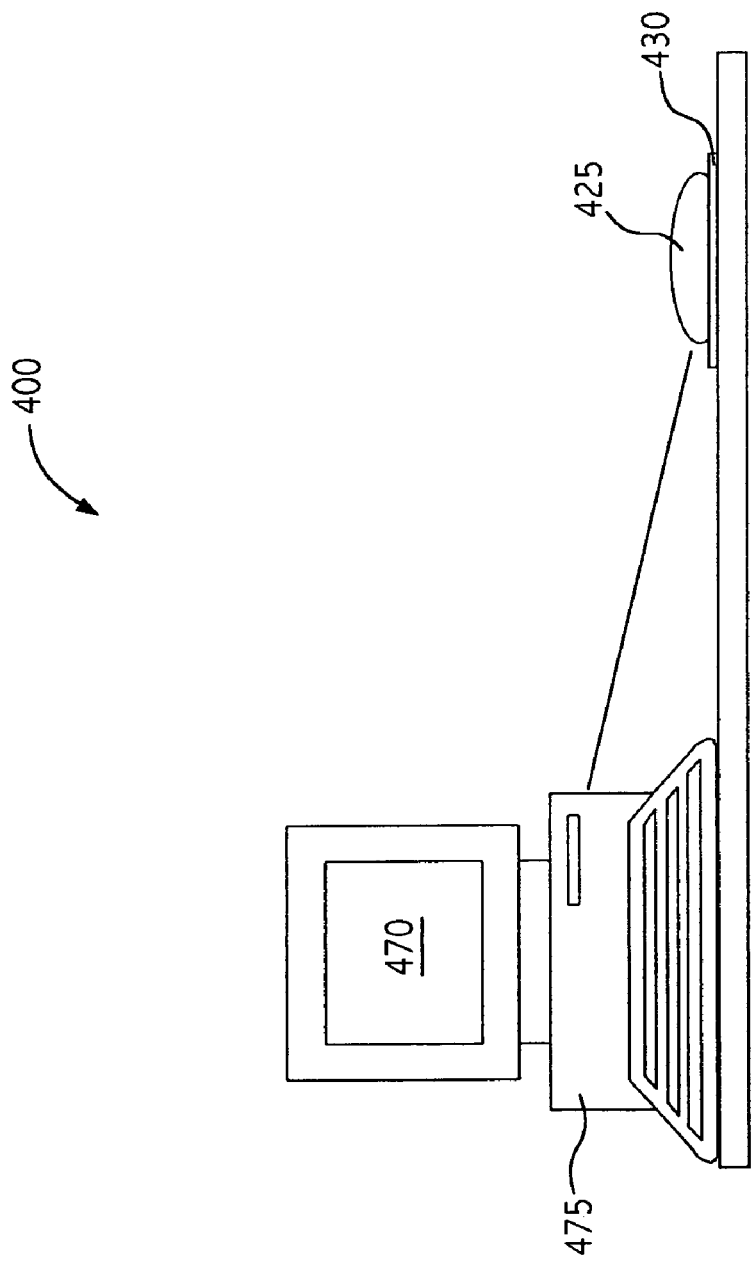
FIG. 4b shows a system in accordance with the invention.

FIG. 4b is a representation of system 400 in accordance with the invention where optical mouse 425 moves over fixed surface 430. Optical mouse typically includes an detector array unit such as detector array unit 311 of FIG. 3a. A series of specular reflection images is typically converted to positional information in optical mouse 425 by processor 320 (see FIG. 3) and sent by wire or sent wirelessly to central processor unit 475 for display on video screen 470 as a positional pointer such as an arrow. Alternatively, raw or intermediate data may be sent from detector array unit 311 (see FIG. 3a) to central processor unit 475 for processing. Wireless connections may be either radio frequency or infrared and wireless embodiments of optical mouse 425 in accordance with the invention may be powered by, for example, a rechargeable battery, fuel cell or solar cells.

Figure 5:
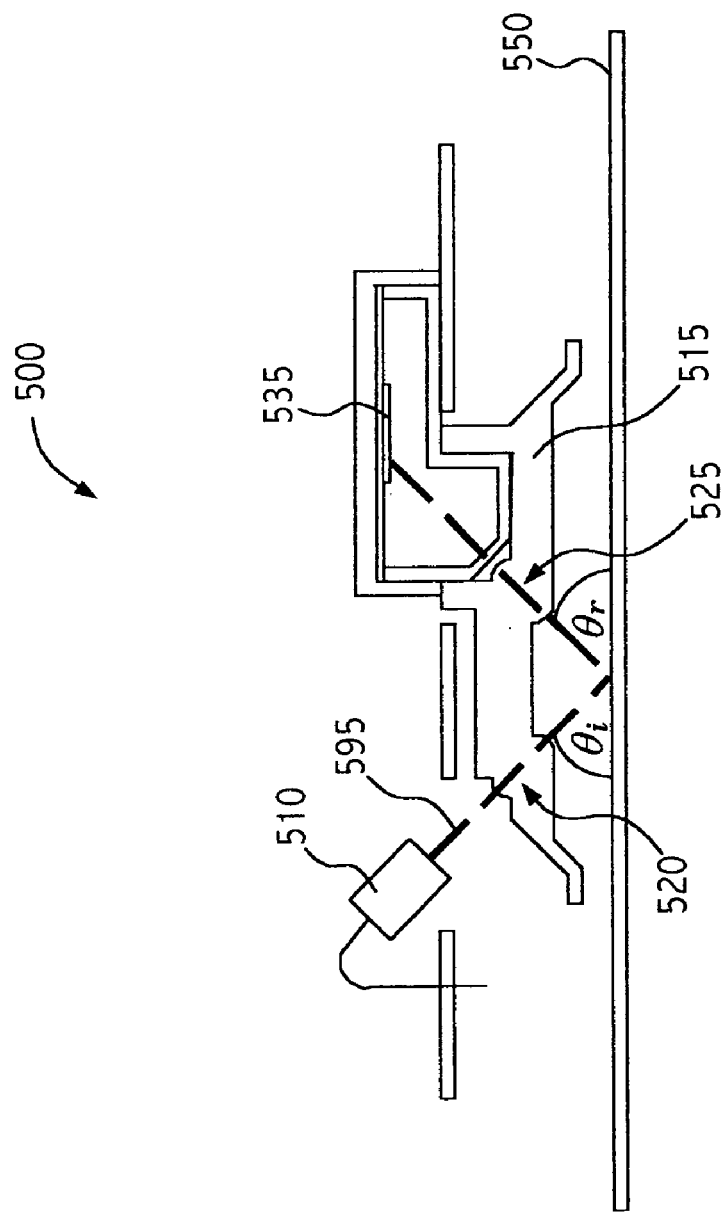
FIG. 5 shows an embodiment in accordance with the invention.

FIG. 5 shows an embodiment of optical navigation device 500 in accordance with the invention. Packaged VCSEL and sensor die 510 is discrete and functions as the light source with collimating lens 520 and imaging lens 525 integrated and formed in molded plastic structure 515. Sensor die 535 incorporates an detector array such as detector array 310 discussed above. The integration of collimating lens 520 and lens 525 into molded plastic structure simplifies manufacturing and reduces cost. The detector array in sensor die 535 is positioned to receive light at the angle of reflection $\theta_r$, which is equal to the angle of incidence $\theta_i$ for beam 595, thereby assuring that the resulting signal from the detector array represents the specular reflection. Sensor die 535 may be oriented so that beam 595 is incident normal to the plane of the detector array.

Figure 6:
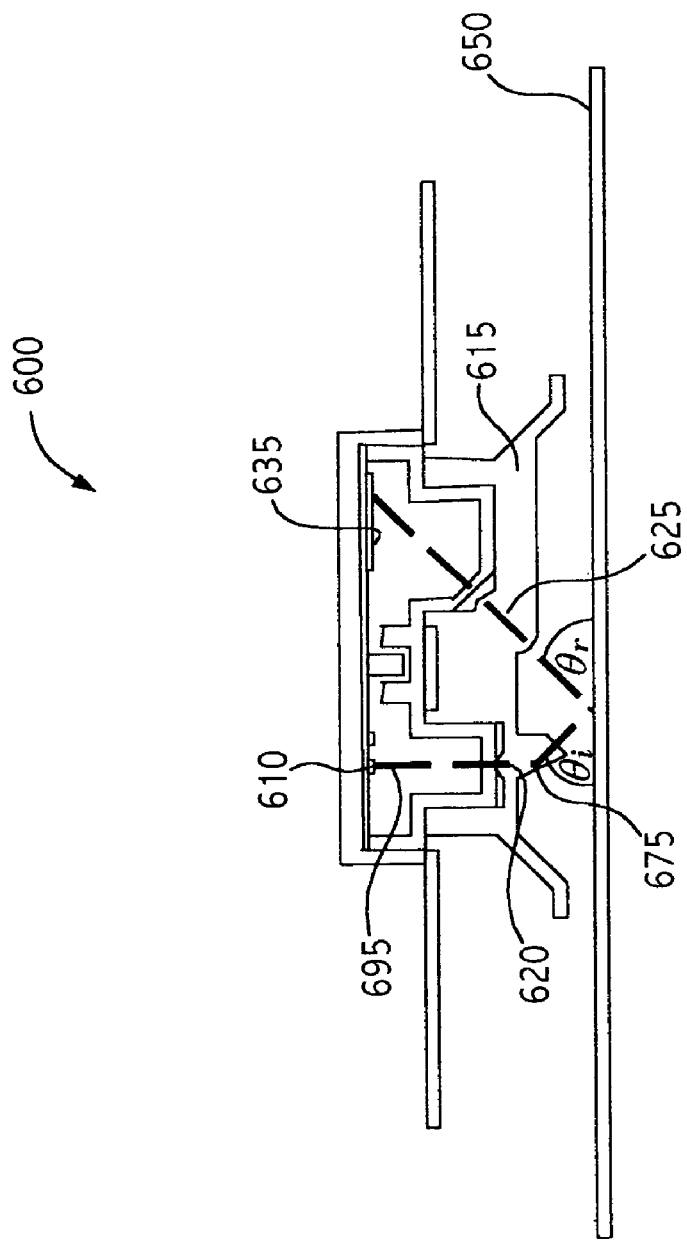
FIG. 6 shows an embodiment in accordance with the invention.

FIG. 6 shows an embodiment of optical navigation device 600 in accordance with the invention. Integrated VCSEL 610 die functions as the light source with collimating lens 620 and lens 625 integrated and formed in molded plastic structure 615. Sensor die 635 incorporates an detector array such as detector array 310 discussed above. The integration of collimating lens 620 and imaging lens 625 into molded plastic structure simplifies manufacturing and reduces cost. Beam 695 travels vertically through collimating lens 620 and is reflected by total internal reflection face 675 to be incident on surface 650 at an angle of incidence $\theta_i$. The detector array in sensor die 635 is positioned to receive light at the angle of reflection $\theta_r$ which is equal to the angle of incidence $\theta_i$ for beam 695, thereby assuring that the resulting signal from the detector array represents the specular reflection. Sensor die 635 may be oriented so that beam 695 is incident normal to the plane of the detector array.

Figure 7:
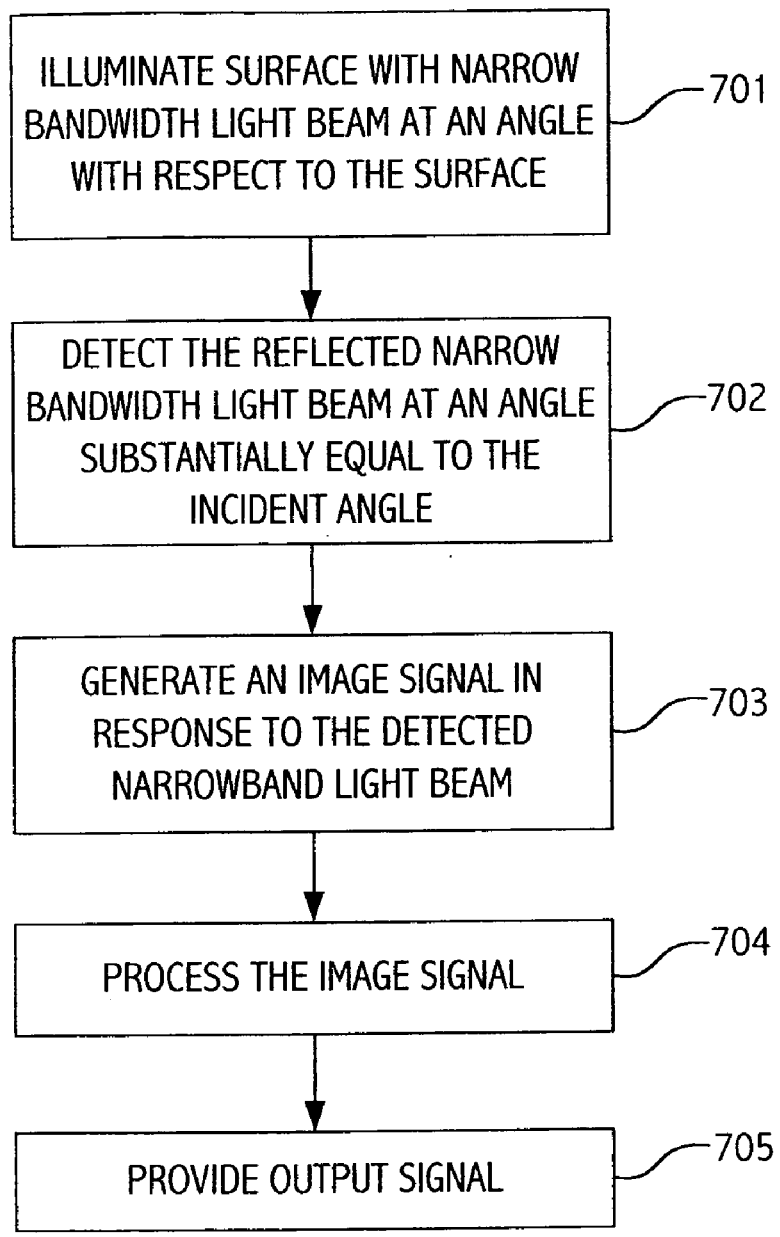
FIG. 7 shows a flow diagram depicting steps involved in a method in accordance with the invention.

FIG. 7 is a flow diagram showing the steps involved in a method of using optical navigation system 303 in accordance with the invention. In step 701, surface 303 is illuminated by narrow bandwidth light beam 398 at an angle of incidence, $\theta_i$. In step 702, detector array 311 detects reflected narrow bandwidth light beam 399 at an angle of reflection $\theta_r$, close to or equal to the angle of incidence $\theta_i$. In step 703, an image signal is generated by detector array 311 in response to narrow bandwidth light beam 399. In step 704, the image signal is processed by processor 320. In step 705, output signal 375 is provided in response to image signal 370 and may be used, for example, to control a positional pointer on video screen 470.

Figure 8:
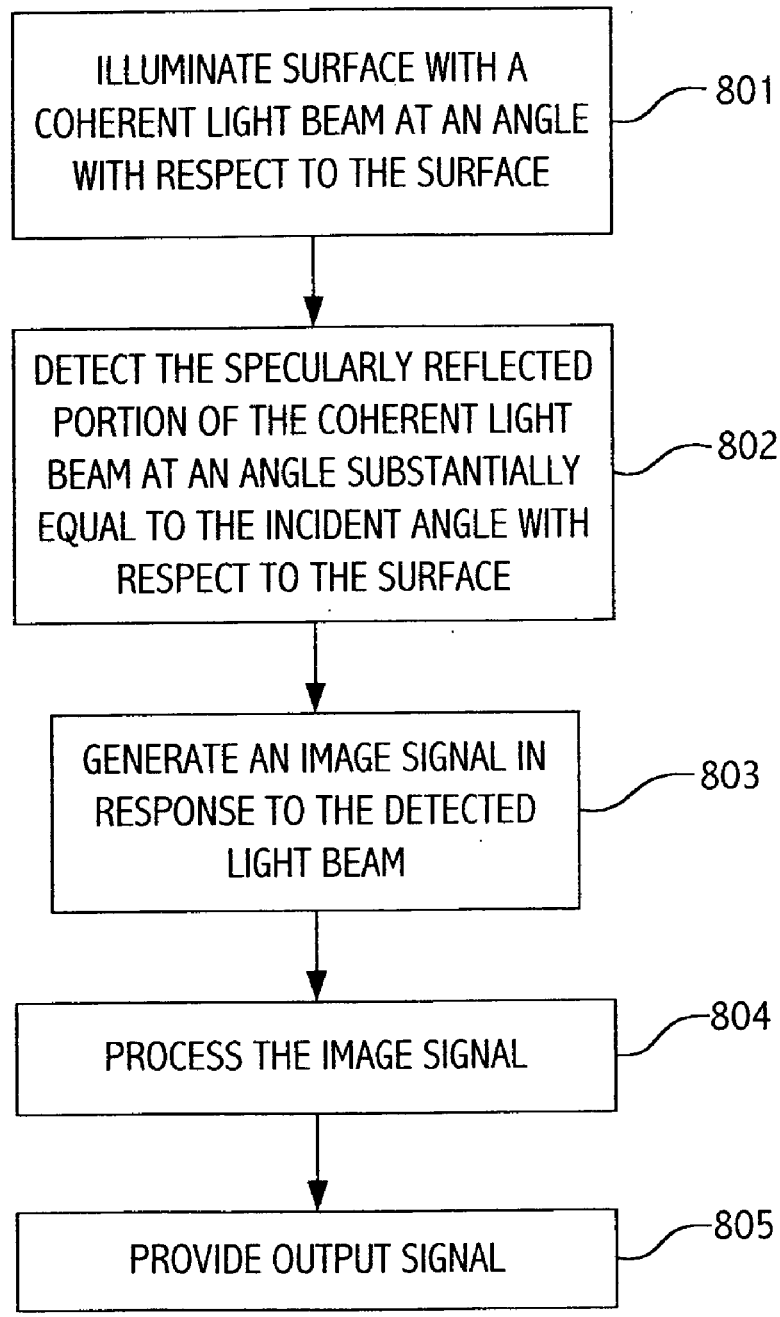
FIG. 8 shows a flow diagram depicting steps involved in a method in accordance with the invention.

FIG. 8 is a flow diagram showing the steps involved in a method of using optical navigation system 303 in accordance with the invention. In step 801, surface 303 is illuminated by coherent light beam 398 at an angle of incidence, $\theta_i$. In step 802, detector array 311 detects reflected light beam 399 at an angle of reflection $\theta_r$, close to or equal to the angle of incidence $\theta_i$. In step 803, an image signal is generated by detector array 311 in response to light beam 399. In step 804, the image signal is processed by processor 320. In step 805, output signal 375 is provided in response to image signal 370 and may be used, for example, to control a positional pointer on video screen 470.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. An optical navigation device comprising:
   a coherent light source for illuminating a surface with a light beam at an angle of illumination with respect to said surface;
   a detector positioned at an angle of reflection with respect to said surface operable to receive a reflected portion of said light beam from said surface, wherein said angle of reflection is substantially equal to said angle of illumination, said detector configured to capture first and second two-dimensional images generated by the specular reflection off said surface; and
   a processor that compares said first and second captured images taken at first and second times, respectively, and generates an output signal that is coupled to an external device and is indicative of a direction and distance through which said optical navigation device moved between said first and second times.

2. The device of claim 1 wherein said coherent light source is a laser.

3. The device of claim 2 wherein said laser is a VCSEL.

4. The device of claim 1 wherein said detector is a CMOS imager.

5. The device of claim 1 further comprising a collimation lens to improve the light collection efficiency.

6. The device of claim 1 further comprising a lens positioned to be operable to image a diffraction image of said surface onto said detector.

7. The device of claim 1 wherein said surface lies outside the nominal image plane of the detector.

8. A system for controlling a positional pointer on a video screen of a computer using a mouse to detect relative motion with respect to a surface, said system comprising:
   means for generating coherent specular reflection interference images, each said interference image being specific to a portion of said surface over which said mouse moves; and
   means for converting said coherent specular reflection interference images into signals corresponding to relative motion between said mouse and said surface.

9. The system of claim 8 wherein said generating means comprises a laser light source.

10. The system of claim 8 wherein said means for convening comprises a processor located within said mouse.

11. The system of claim 8 wherein said means for convening comprises a detector array located within said mouse.

12. The system of claim 11 wherein said surface does not lie in the nominal image plane of said detector array.

13. The system of claim 8 wherein said surface is chosen from paper like surface, glossy type surface, painted surface and halftone surface.

14. The system of claim 8 wherein said coherent specular reflection interference images comprise intensity variations.

15. A method for determining relative motion between an optical navigation device and a surface comprising:
   providing a coherent light beam at an angle of illumination with respect to said surface for illuminating said surface;
   receiving first and second two-dimensional images at first and second times, respectively, in a detector from a specularly reflected portion of said coherent light beam at an angle of reflection with respect to said surface, such that said angle of reflection is substantially equal to said angle of illumination; and
   comparing said first and second images and generating an output signal that is coupled to an external device that is indicative of a direction and distance through which said optical navigation device moved between said first and second times.

16. The method of claim 15 wherein said coherent light beam is provided by a laser.

17. The method of claim 15 wherein said specularly reflected portion of said coherent light beam is received by a detector array.

18. The method of claim 15 further comprising generating a signal in response to the diffraction pattern of said specularly reflected portion of said coherent light beam.

19. The method of claim 17 wherein said surface lies outside the nominal image plane of said detector array.

20. A method for determining relative motion between an optical navigation device and a surface comprising:

provjding a coherent light beam at an angle of illumination with respect to said surface for illuminating said surface;

receiving first and second two-dimensional images at first and second times, respectively, in a detector from a specularly reflected portion of said coherent light beam at an angle of reflection with respect to said surface, such that said angle of reflection is substantially equal to said angle of illumination;

comparing said first and second images to determine a direction and distance through which said optical navigation device moved between said first and second times;

Further comprising generating a signal in response to the diffraction pattern of said specularly reflected portion of said coherent light beam; and further comprising a processor to receive said signal and produce an output signal for controlling a positional pointer.

* * * * *